J. SHUCK.
Harrows.

No. 157,878.  Patented Dec. 15, 1874.

WITNESSES
George E. Upham
Emory H. Bates

INVENTOR
Jacob Shuck
By Chipman Hosmer & Co.
ATTORNEYS.

UNITED STATES PATENT OFFICE.

JACOB SHUCK, OF EDDYVILLE, IOWA.

IMPROVEMENT IN HARROWS.

Specification forming part of Letters Patent No. 157,878, dated December 15, 1874; application filed November 8, 1873.

*To all whom it may concern:*

Be it known that I, JACOB SHUCK, of Eddyville, in the county of Wapello and State of Iowa, have invented a new and valuable Improvement in Harrows; and I do hereby declare that the following is a full, clear, and exact description of the construction and operation of the same, reference being had to the annexed drawings, making a part of this specification, and to the letters and figures of reference marked thereon.

Figure 1:
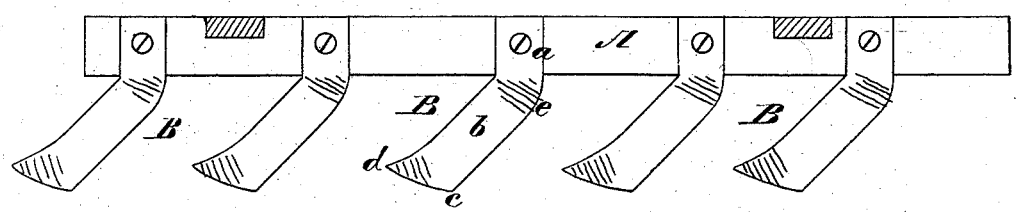
Figure 2:
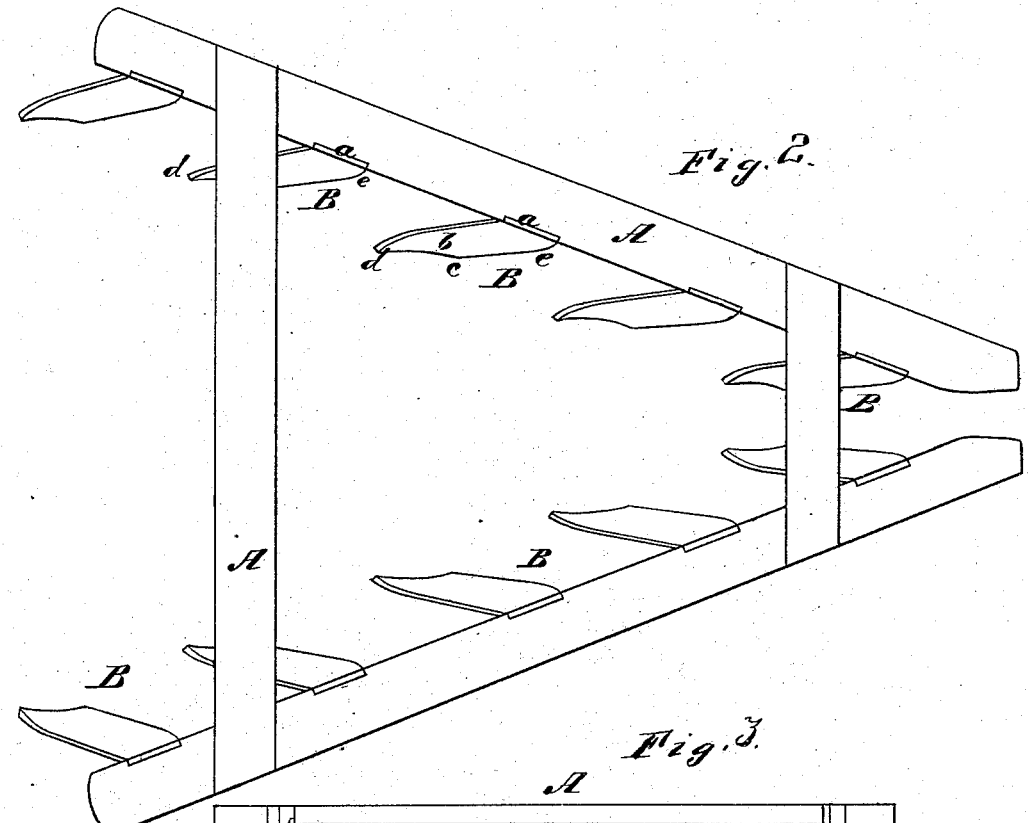
Figure 3:
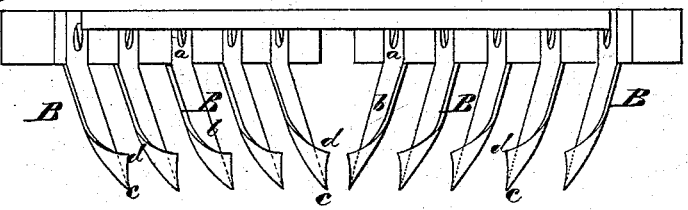

Figure 1 of the drawing is a representation of a sectional view of my harrow. Fig. 2 is a plan view of the same. Fig. 3 is a rear end view of the same.

This invention has relation to harrows of the triangular pattern; and it consists in the construction and novel arrangement, in connection with each oblique side beam, of the series of knives, each of peculiar form, extending outward and backward, from front edge to rear, inward, downward, and rearward from head to point, and inward, upward, and backward at the extreme point, as hereinafter more fully described.

The object in view is to force the lower soil of the furrow, made by each knife, to the surface, and to turn the upper soil under and spread the whole evenly.

My object is to obtain a harrow the teeth of which will not only cut their way through the soil without becoming clogged, but will lift and turn the surface-soil and leave the land in an excellent condition for the seed.

The following is a description of my improvement:

In the accompanying drawings, A represents a triangular harrow-frame, to the diverging side bars of which a number of teeth or blades, B, are secured, and arranged at even distances apart, one behind the other. Each tooth or blade B consists of a stiff plate of steel, which is constructed with a vertical portion, $a$, and an inclined portion, $b$. The vertical portion $a$ is recessed into the harrow-frame, and firmly secured thereto. The lower portion $b$ is inclined inwardly, or toward the center of the frame A, and also backwardly, terminating in an obtuse angle, $c$, and an acute angular portion, $d$, which is twisted inwardly and upwardly. At $e$ the front double-inclined edge is rounded, and from this point to the angle $c$ the edge is sharp, so that it will cut its way through the soil.

The inclinations given to this cutting-edge cause the blade to make a draw-cut, and prevent the lodgment of weeds and other substances.

The inward inclination of the blade causes it to run well under the soil, so that the twisted or upturned portion $d$ will turn over and spread the soil loosely.

It will be observed that if the blades were not inclined inwardly, the upturned portion $d$ could not turn over the soil and spread it, but would only move it laterally and leave furrows, which would not be filled up by succeeding blades, unless the blades were arranged too close together. I therefore consider the inward inclination of the blades as a very important part of my improvement, and essential to the proper working of the implement.

Collectively the blades will turn and spread the surface-soil evenly, and leave the land in a good condition to receive various kinds of seeds; and when the implement is run over the land after the seed has been scattered, the blades will turn the soil loosely over them, and at the same time cut up and turn under the weeds.

I am aware that harrows have been provided with cutting-blades for stirring the surface-soil and destroying weeds; but such blades were arranged in vertical planes, and would not reach laterally under the soil, nor turn it over. The outer face of each tooth being inclined outward from front edge to rear, it will draw the deeper soil of its furrow upward, leaving it in a ridge at the side of its path. The succeeding tooth, being arranged to pass on the outside of this ridge, with its inwardly and downwardly inclined face toward the same, will scoop it up in the position in which it lies, with the deep soil uppermost, will draw under still more the hard or matted surface, and as the whole passes over the upturned rear point, it will be broken and distributed, the original surface-soil and matter below the upturned deep soil.

I am well aware that oblique harrow-knives have been employed with triangular frames; hence I do not claim such invention, broadly.

What I claim as new, and desire to secure by Letters Patent, is—

The combination, with the oblique harrow-beams A, of the angular teeth described, each consisting of a vertical head, $a$, parallel with the side of the beam to which it is secured, and the inwardly and rearwardly inclined blade $b$, having its outside face turned obliquely outward from front edge to rear, and terminating in an angular end turned upward, inward, and rearward, as specified.

In testimony that I claim the above I have hereunto subscribed my name in the presence of two witnesses.

JACOB SHUCK.

Witnesses:
  R. S. DICKSON,
  N. O. FROST.